(12) United States Patent
Gaubert et al.

(10) Patent No.: US 6,623,710 B1
(45) Date of Patent: Sep. 23, 2003

(54) NUCLEAR FUEL REPROCESSING

(75) Inventors: Emmanuel Gaubert, Manchester (GB); Gavin Paul Towler, Barrington, IL (US); Andrew Lindsay Wallwork, Tadley (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/530,825

(22) PCT Filed: Oct. 28, 1998

(86) PCT No.: PCT/GB98/03199
§ 371 (c)(1),
(2), (4) Date: Sep. 29, 2000

(87) PCT Pub. No.: WO99/23667
PCT Pub. Date: May 14, 1999

(30) Foreign Application Priority Data

Oct. 31, 1997 (GB) .............................................. 9722930

(51) Int. Cl.[7] .............................................. C22B 60/00
(52) U.S. Cl. ................................ 423/8; 423/9; 423/10; 976/DIG. 279

(58) Field of Search .......... 423/8, 9, 10; 976/DIG. 279; 422/159

(56) References Cited

U.S. PATENT DOCUMENTS

| 3,595,629 | A | * | 7/1971 | Schulz |
| 4,595,529 | A | * | 6/1986 | Neace .......................... 423/10 |
| 4,983,300 | A | | 1/1991 | Germain et al. ............. 210/634 |
| 5,219,533 | A | * | 6/1993 | Larson |

FOREIGN PATENT DOCUMENTS

| EP | 0321348 | | 6/1989 |
| EP | 0638907 | | 2/1995 |
| WO | 97/30456 | * | 8/1997 |

* cited by examiner

*Primary Examiner*—Steven Bos
(74) *Attorney, Agent, or Firm*—Edwin D. Schindler

(57) ABSTRACT

A spent fuel reprocessing method including the steps of partitioning U and Pu(III) in a solvent by solvent extraction and subsequently polishing the solvent in a neptunium rejection operation for removing Np therefrom. The solvent obtained from the neptunium rejection operation (the polished solvent or NpA solvent product) is then recycled to a U/Pu partitioning operation. The method enables a reduction in solvent feed and solvent effluent volumes.

8 Claims, 2 Drawing Sheets

NUCLEAR FUEL REPROCESSING

This invention relates to nuclear fuel reprocessing and is particularly concerned with the separation of uranium, plutonium and neptunium.

Most commercial reprocessing plants use the Purex process, in which the spent fuel is dissolved in nitric acid and the dissolved uranium and plutonium are subsequently extracted from the nitric acid solution into an organic phase of tributyl phosphate (TBP) dissolved in an inert hydrocarbon such as odourless kerosene. The organic phase is then subjected to solvent extraction techniques to partition the uranium from the plutonium.

More particularly, the organic phase is subjected to separation of fission products by solvent extraction and typically then to removal of technetium, before the so-called U/Pu split. In the U/Pu split, Pu(IV) is reduced to Pu(III) which is inextractable into the organic phase and therefore follows the aqueous stream while the U remains in the organic stream. Usually, the reducing agent used in the U/Pu split is U(IV). Hydrazine nitrate is normally used to stabilise the U(IV) and Pu(III) against oxidation by, in particular, $HNO_2$ The unit for carrying out the partitioning of the U and Pu in practice comprises a contactor having a multiplicity of stages, for example six stages might be used in a modern centrifugal contactor.

In Purex reprocessing, neptunium valency control can be a significant problem. Neptunium is present in the Purex process as a mixture of three different valence states: Np(IV), (V) and (VI). Np(IV) and (VI) are both extractable into the solvent phase whereas Np(V) is inextractable into this phase. In order to direct Np to raffinate streams, Np is normally stabilised in the (V) oxidation state. This is a complex matter, since not only is it the middle oxidation state of three but Np(V) also undergoes competing reactions, such as disproportionation to Np(IV) and (VI) and is oxidised to Np(VI) by nitric acid. Neptunium control is therefore difficult and efficient neptunium control is a major aim of an advanced reprocessing programme.

After fuel dissolution, Np is likely to be present as a mixture of all three oxidation states. Np(V) will be separated with the aqueous phase at an earlier stage. Np(IV) and (VI) will follow the solvent (containing uranium and plutonium) into the U/Pu split. In the U/Pu split, Np is reduced to Np(IV) which follows the uranium stream into the solvent product. Np is then separated from uranium during the uranium purification cycle.

Commercial reprocessing plants operate multi-cycle processes in which each separation or purification step is performed a plurality of times. It would be desirable to provide a single cycle process, enabling the more efficient reprocessing of fuel.

The present invention provides a spent fuel reprocessing method adapted to reduce Pu to Pu(III) and Np to Np(IV) which includes;

(i) a first step of treating a mixture, containing Pu and Np, and optionally U, with hydroxylamine; and (ii) a second step of treating the mixture resulting from step (i) with U(IV).

The method is normally performed as part of the U/Pu partition operation. The invention enables the efficient reduction of Pu and Np in the same contactor(s) and obviates the routing of some of the reductant to the subsequent contactor where Np is rejected from the solvent phase. Moreover, the method provides an opportunity to decrease the number of stages in the U/Pu split because the load of U to recover is less than with prior methods which exclusively use U(IV) to reduce Pu and Np.

In preferred methods the mixture is treated first with the hydroxylamine and subsequently with the U(IV). Preferably, the aqueous phase containing the U(IV), is then held at an elevated temperature to allow all or most of the Np to be reduced to Np(IV).

A preferred class of processes are those performed as part of the U/Pu split operation and in which a solvent stream containing U. Pu and Np is contacted with the hydroxylamine and passed through a contactor stage, the aqueous stream from which is then contacted with concentrated U(IV) and supplied to a tank where it is maintained at an elevated temperature for a time sufficient for at least a majority of the Np to be reduced to Np(IV). The resultant liquid is passed through one or more further contactor stages for the re-extraction of U and Np(IV) into the solvent phase.

In another aspect, the invention resides in a spent fuel reprocessing method comprising the partitioning of U and Pu(III) by solvent extraction and the subsequent polishing of the solvent to remove Np therefrom. This method includes the step of recycling solvent from the Np rejection/U recovery (NpA solvent product) operation to the U/Pu partitioning operation. The method enables a reduction in solvent feed and solvent effluent volumes.

In preferred methods of this aspect, the U/Pu split operation is performed in a multi-stage contactor and the NpA solvent product is fed into the solvent stream immediately prior to the final contactor through which the solvent flows.

A further aspect of the invention is a Purex reprocessing plant in which the U/Pu partitioning apparatus includes a criticality safe vessel for temporarily storing the aqueous stream. Preferably the vessel includes means for heating the aqueous stream and/or an inlet for introducing U(IV) into the vessel. The partitioning apparatus may comprise a multi-stage contactor, the vessel being located in the flowpath of the aqueous stream between two contactors.

In a fourth aspect, the invention provides a Purex reprocessing plant in which a conduit is provided between the solvent outlet of the Np rejection/U recovery operation and the U/Pu split apparatus to enable polished solvent to be recycled to the split operation. Preferably, the split apparatus comprises a multi-stage contactor and the conduit enters the solvent flowpath of the partitioning apparatus prior to the final contactor through which the solvent flows.

In the fifth aspect, the invention provides a Purex reprocessing plant in which a conduit is provided between the aqueous product outlet of the Np rejection operation and the U/Pu split apparatus to enable a fraction of the Np rejection aqueous stream to be recycled to the split operation. This conduit normally includes a vessel to allow formohydroxamic acid hydrolysis to go to completion and so produce hydroxylamine to be used in the U/Pu split. This recycle would minimise the effluent flowrates and, normally, the flowrate of fresh hydroxylamine. The invention therefore includes a spent fuel reprocessing method which includes recycling a fraction of the aqueous stream of the Np rejection operation to the U/Pu split.

In the sixth aspect, the invention provides a Purex reprocessing plant in which a conduit is provided between the solvent stream of the U/Pu split and the Tc rejection or fission product removal operation to enable a fraction of the U/Pu split solvent stream to be recycled to earlier operations. This conduit normally includes a vessel to allow U(IV) oxidation and Pu(III) re-oxidation to go to completion. This recycle would enable a reduction in the solvent feed and minimise the solvent effluent flowrates. The invention therefore includes a spent fuel reprocessing method which includes recycling a fraction of the solvent of the U/Pu split to the Tc rejection or fission product removal operation.

The present invention is further described by way of example only with reference to the accompanying drawings, in which:

FIG. 1 is therefore a flowsheet of a notional, single-cycle Purex reprocessing plant which does not include any inventive feature. The flowsheet contains the units shown in Table 1 and uses the following symbols:

Ai=Aqueous Feeds
Si=Solvent feeds
Ii=Intermediate solvent streams
Pi=Product streams
Double arrows =Solvent streams
Single arrows =Aqueous streams
Dotted arrows Recycle streams

TABLE 1

| Unit name | Part of flowsheet | Role |
| --- | --- | --- |
| HS | Fission products separation | Strip to aqueous phase fission products and Zr |
| HA | Fission products separation | Recover U and Pu by a back extraction to the organic phase. Rejection of fission products |
| TcSS | Tc rejection | Acidity washing of organic phase |
| TcS | Tc rejection | High acidity Tc scrubbing to the aqueous phase |
| TcA | Tc rejection | Recovery with a back extraction to the organic phase. Tc rejection |
| BX | U/Pu split (Partition) | Reduce acidity for Np reduction |
| BS | U/Pu split | Pu rejection with Np (U recovery) |
| BSS | U/Pu split | Pu rejection with Np (U recovery) |
| Tank 1 | U/Pu split | Np reduction with U (IV) |
| Tank 2 | Between Np rejection & U/Pu split | Hydrolysis of FHA |
| Tank 3 | Between U/Pu split & Tc rejection or Fission product separation | Oxidation of U (IV) and Pu (III) |
| NpS | Np rejection | Scrubbing of Np |
| NpA | Np rejection | Recover U with a back extraction to the organic phase Np rejection |

Figure 1:
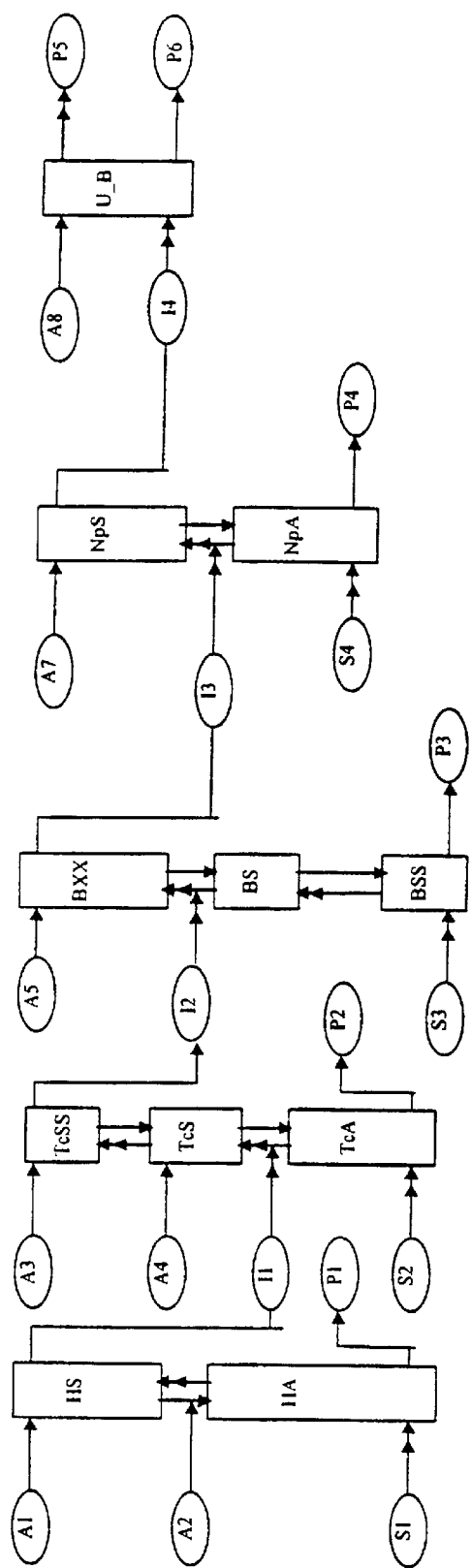
FIG. 1 is an overview of a single-cycle reprocessing flowsheet.
Figure 2:
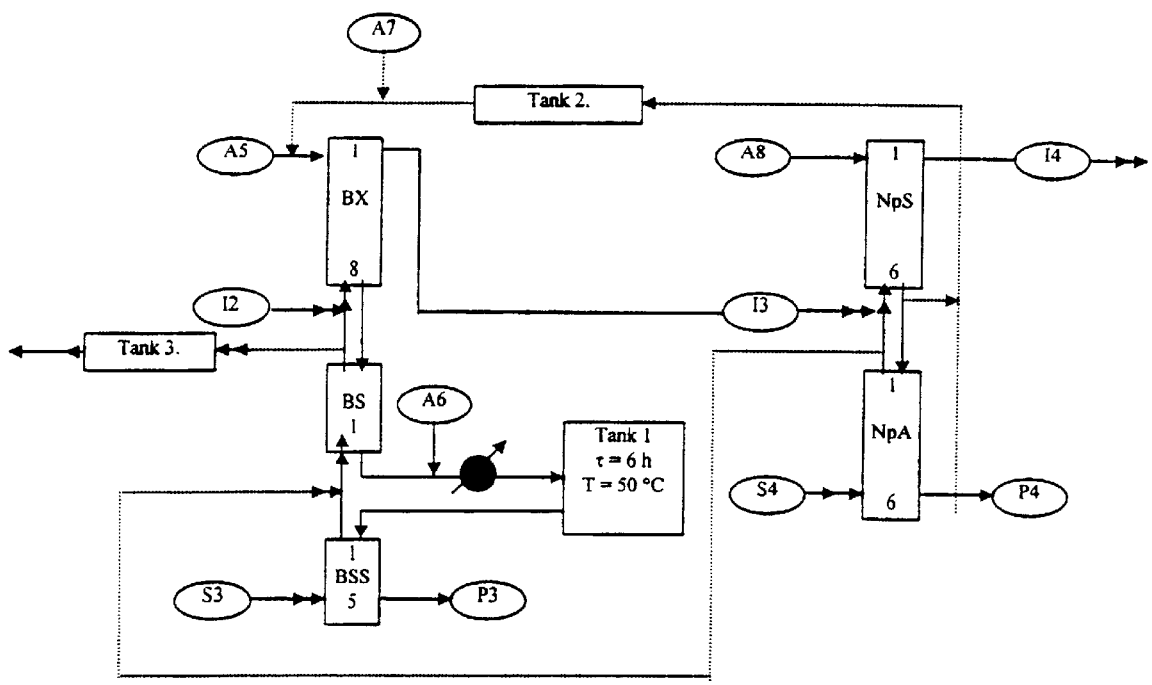
FIG. 2 is a partial flowsheet of a Purex reprocessing process incorporating the methods of the invention.

The nitric acid solution resulting from dissolution of spent fuel is subject to removal of fission products and Tc, for example in conventional manner using units HS, HA, TcSS, TcS and TcA (FIG. 1). The resulting organic stream containing U, Pu and Np is sent to the U/Pu split operation which is performed in units BX, BS and BSS (FIG. 2). The aqueous feeds, intermediate solvent streams and product streams shown in FIG. 2 are as follows:

| A5: | hydroxylamine | I2: | solvent product of Tc removal |
| --- | --- | --- | --- |
| A6: | U (IV) | I3: | solvent product of U/Pu split |
| A7: | water | P4: | Np product |
| A8: | formohydroxamic acid | P3: | Pu product |

In the U/Pu split, the organic stream is contacted with hydroxylamine (HAN), in this case in unit BX. The HAN is used as a reductant: it reduces Np(VI) to Np(V) and it reduces PU(IV) to give Pu(III). The aqueous liquor goes from unit BX to unit BS, to partially re-extract U. In this example, unit BS contains a single centrifugal contactor stage.

The aqueous product from unit BS is mixed with a concentrated U(IV) feed and passed to a criticality safe tank 1, where it is stored at an elevated temperature, for example from 30 to 90 ° C. and more particularly of about 50 ° C., to allow the reduction of inextractable Np(V) to extractable Np(IV). The residence time in the tank may be about 6 hours, for example.

The product liquid from the tank 1 goes to unit BSS, where the remainder of the U is re-extracted as well as the Np.

As compared with a conventional process in which Np and Pu are reduced solely with U(IV), the above described process in its preferred embodiments uses a very small amount of depleted U(IV). As a result, little or no U(IV) is found in the Np product. Moreover, almost no U(IV) is backwashed with the Pu product, which is thus purer. The process gives an opportunity for the number of stages in the U/Pu split operation to be decreased. The reduced uranium load in the solvent makes the solvent easier to recycle (see below). Finally, less depleted U(IV) is added to the 235U to be recovered and the final U stream is therefore more suitable for a uranium enrichment process.

The solvent stream containing uranium and neptunium leaves unit BX for unit NpS, where Np removal occurs. Formohydroxamic acid (FHA) may be used to reduce and complex the Np, as described in WO 97/30456. Specifically, Np is removed from the uranium product solvent stream in a "Neptunium Polish" contactor using FHA as a complexant for Np(IV) and a reductant for Np(VI). This gives a relatively pure 237 Np stream which can be disposed of independently if desired. Any residual Pu(IV) in this contactor will also be removed by complexation with FHA. Generally, the contactor is operated at room temperature to minimise FHA hydrolysis, but this is not an essential requirement.

The aqueous stream which leaves unit NpS goes to unit NpA, where U recovery is performed, for example in conventional manner. The treated solvent can be recycled from unit NpA to the U/Plu split operation. The recycled solvent is preferably fed to where it matches best the nitric acid concentration and U loading of the U recovery unit BS/BSS of the split operation. Accordingly, in the illustrated embodiment, the solvent is fed into the solvent stream of the U recovery operation immediately before unit BS.

A fraction of the Np aqueous product can also be recycled to the U/Pu split operation to reduce the inventory of fresh HAN used. In preferred embodiments, a fraction of the NpA aqueous product is fed to tank 2 to allow further (and preferably complete) hydrolysis of formohydroxamic acid to hydroxylamine and formic acid. In practice, it is then diluted to reduce the acidity before being mixed with the hydroxylamine feed to the BS contactors.

A fraction of the BS solvent product can also be recycled to the Tc rejection or fission product removal contactors to reduce the solvent inventory used. It is normally first fed to tank 3 to ensure complete oxidation of U(IV) and Pu(III).

The Decontamination Factor (DF) of an operation is calculated as feed molar flowrate divided by the outlet molar flowrate. The DF values and U concentrations were determined for a simulated operation of a reprocessing plant incorporating the NpA to BS recycle. Satisfactory results were obtained, but a decrease was noted in the uranium DF value in the Pu product. This recycle operation may therefore be particularly suitable for use where the Pu stream is used for the fabrication of MOX fuel (MOX=Mixed Oxide (U+Pu)).

It will be appreciated that the above-described process exemplifies a Purex reprocessing method in which the U/Pu split operation involves treating the solvent stream with hydroxylamine to reduce Pu(IV) to Pu(III) and Np to Np(V) and subsequently treating the aqueous stream with U(IV) to reduce Np to Np(IV), and in which polished solvent from the neptunium rejection/U recovery operation is recycled to the U/Pu partitioning operation. It also includes the option to recycle a fraction of the Np product to reduce the inventory of fresh hydroxylamine. Of course, the reprocessing method may include just one or two of these methods of the invention.

Uranium and/or plutonium recovered using a method of the invention may be formed into fissile material, for example a fuel pellet. Exemplary fissile material is MOX fuel. The invention therefore includes a process for reprocessing nuclear fuel to form a fissile material optionally in the form of a fuel pellet, a fuel pin or a fuel assembly, the process comprising performing a method of the invention.

What is claimed is:

1. A spent fuel reprocessing method, comprising the steps of:
   partitioning U and Pu(III) in a solvent via solvent extraction;
   polishing said solvent in a neptunium rejection operation for removing Np from said solvent to form a polished solvent; and,
   recycling said polished solvent from said neptunium rejection operation to a U/Pu split operation.

2. The spent fuel reprocessing method according to claim 1, wherein said partitioning of U and Pu(III) is performed in a multi-stage contactor and recycled solvent is fed into a stream of said solvent immediately prior to a final contactor through which said solvent flows.

3. A spent fuel reprocessing method, comprising the steps of:
   partitioning U and Pu(III) in a solvent via solvent extraction;
   polishing said solvent in a neptunium rejection operation for removing Np from said solvent to form a polished solvent; and,
   recycling said polished solvent from said neptunium rejection operation to a U/Pu split operation, said recycling comprising recycling a fraction of an aqueous stream of the Np rejection operation to the U/Pu split operation.

4. The spent fuel reprocessing method according to claim 3, wherein the fraction of the aqueous stream contains formohydroxamic acid which is contained in a vessel for allowing complete hydrolysis of the formohydroxamic acid before being supplied to the U/Pu split operation.

5. A spent fuel reprocessing method, comprising the steps of:
   partitioning U and Pu(III) in a solvent via solvent extraction;
   polishing said solvent in a neptunium rejection operation for removing Np from said solvent to form a polished solvent; and,
   recycling said polished solvent from said neptunium rejection operation to a U/Pu split operation, said recycling comprising recycling a fraction of said solvent of the U/Pu split operation to a Tc rejection operation.

6. The spent fuel reprocessing method according to claim 5, wherein a fraction of said solvent is treated for oxidizing U(IV) and PU(III) before being supplied to the Tc rejection operation.

7. A spent fuel reprocessing method, comprising the steps of:
   partitioning U and PU(III) in a solvent via solvent extraction;
   polishing said solvent in a neptunium rejection operation for removing Np from said solvent to form a polished solvent; and,
   recycling said polished solvent from said neptunium rejection operation to a U/Pu split operation, said recycling comprising recycling a fraction of said solvent of the U/Pu split operation to a fission product removal operation.

8. The spent fuel reprocessing method according to claim 7, wherein a fraction of said solvent is treated for oxidizing U(IV) and Pu(III) before being supplied to the fission product removal operation.

* * * * *